United States Patent [19]
Sato et al.

[11] Patent Number: 5,060,548
[45] Date of Patent: * Oct. 29, 1991

[54] DESK-TOP CIRCULAR SAW

[75] Inventors: Masayuki Sato; Shigeharu Ushiwata, both of Fukushima, Japan

[73] Assignee: Hitachi Koki Haramachi Co., Ltd., Fukushima, Japan

[*] Notice: The portion of the term of this patent subsequent to Sep. 26, 2006 has been disclaimed.

[21] Appl. No.: 345,520

[22] Filed: May 1, 1989

Related U.S. Application Data

[63] Continuation of Ser. No. 127,023, Nov. 27, 1987, Pat. No. 4,869,142.

[30] Foreign Application Priority Data

Feb. 20, 1987 [JP] Japan .................... 62-025738

[51] Int. Cl.⁵ ................. B23D 45/04; B27B 5/20
[52] U.S. Cl. .................. 83/471.003; 83/468.003;
83/486.001; 83/490
[58] Field of Search ............. 83/467 R, 397, 468.3,
83/471.3, 486.1, 490, 581, 589

[56] References Cited

U.S. PATENT DOCUMENTS

| | | | |
|---|---|---|---|
| 2,718,907 | 9/1955 | Fjalstad | 83/581 |
| 3,672,251 | 6/1972 | Jagers | 83/581 |
| 4,163,404 | 8/1979 | Lavis | 83/471.3 |
| 4,452,117 | 6/1984 | Brickner et al. | 83/468.3 |
| 4,537,105 | 8/1985 | Bergler | 83/471.3 |
| 4,581,966 | 4/1986 | Kaiser et al. | 83/490 |
| 4,587,875 | 5/1986 | Deley | 83/471.3 |
| 4,694,720 | 9/1987 | Brickner Jr. et al. | 83/471.3 |

*Primary Examiner*—Hien H. Phan
*Attorney, Agent, or Firm*—Sughrue, Mion, Zinn, Macpeak & Seas

[57] ABSTRACT

A desk-top cutter with a saw blade inclining mechanism, including a turntable rotatably provided on an upper surface of a base, a vice disposed above the turntable for supporting a workpiece on the upper surface of the base, a holder supported inclinably relative to the upper surface of the turntable at the rear end thereof, a slide shaft slidable back and forth at an upper end of the holder substantially parallel to the upper surface of the base, a hinge provided at a forward end of the slide shaft, a motor and a saw blade, and a saw cover covering an upper half of the saw blade. The motor is rotatably support vertically at an upper end of the hinge. A safety cover provided in the saw cover and rotatable around a support provided at the rear portion of the saw cover guards the lower half of the saw blade. The safety cover includes a pair of lower cover members mounted so that end portions of the lower cover members can be rotated upwardly irrespective of the cover holder.

2 Claims, 18 Drawing Sheets

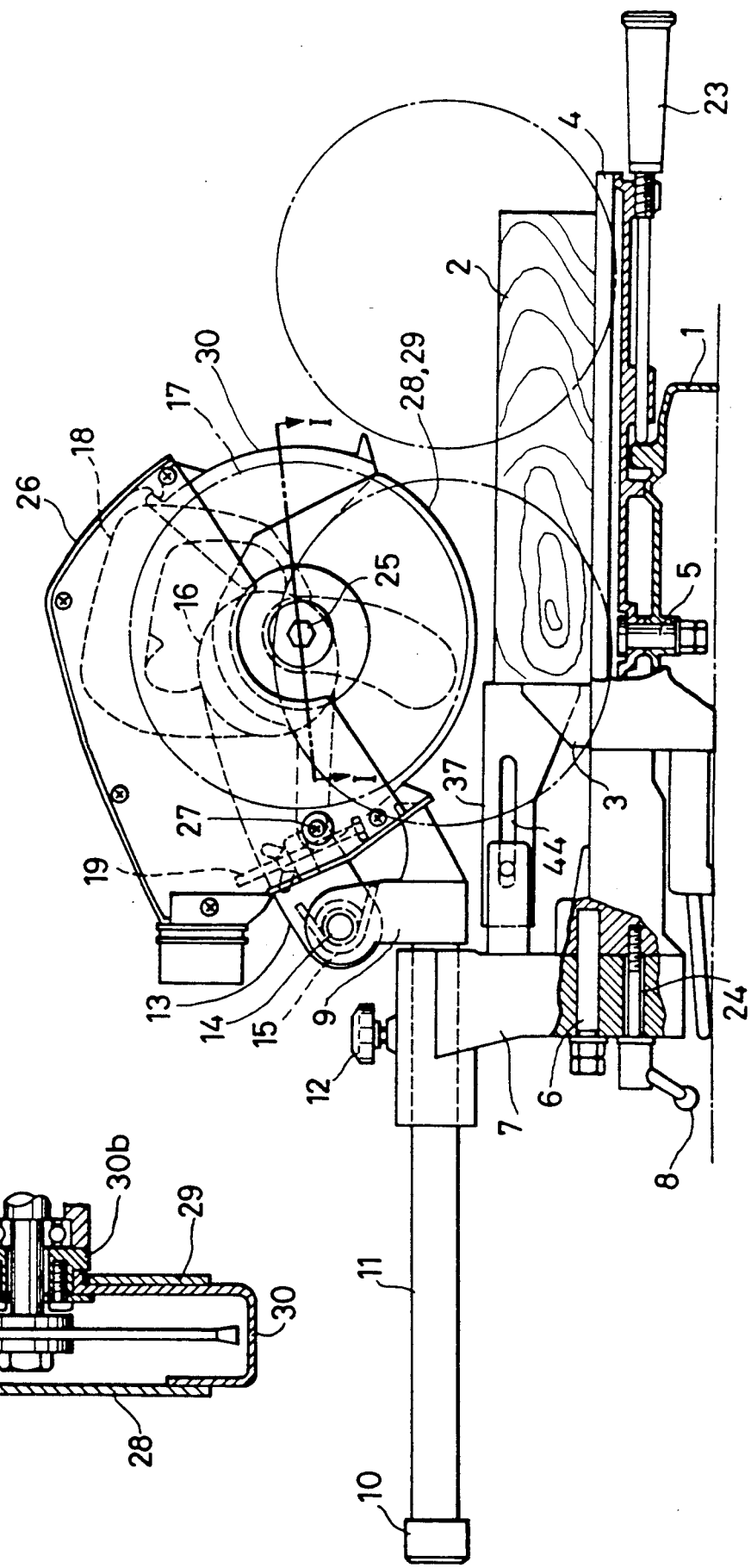
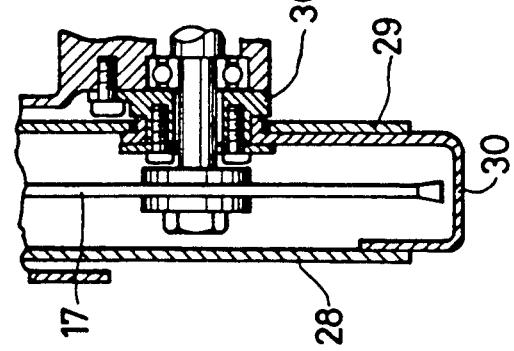

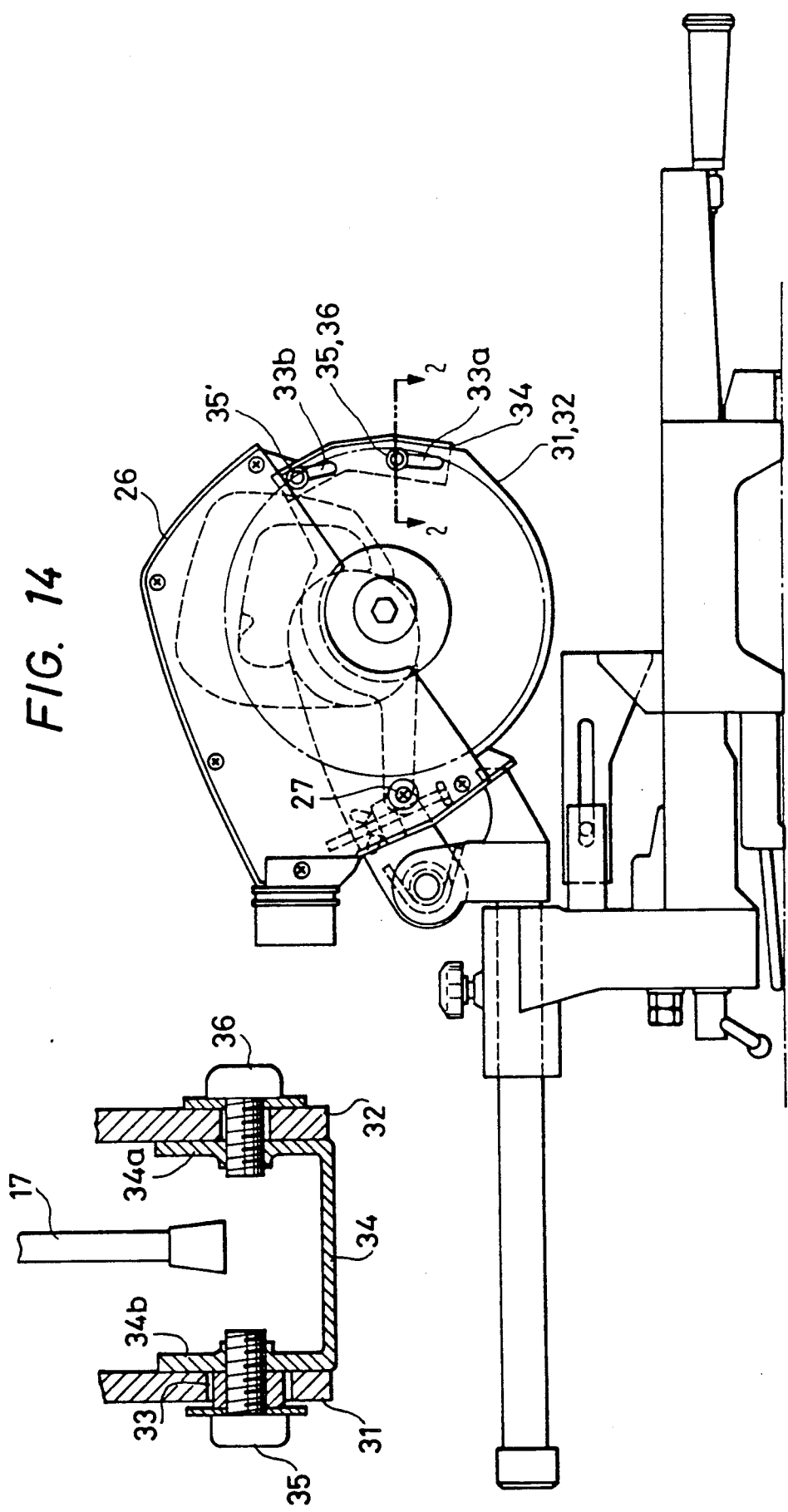

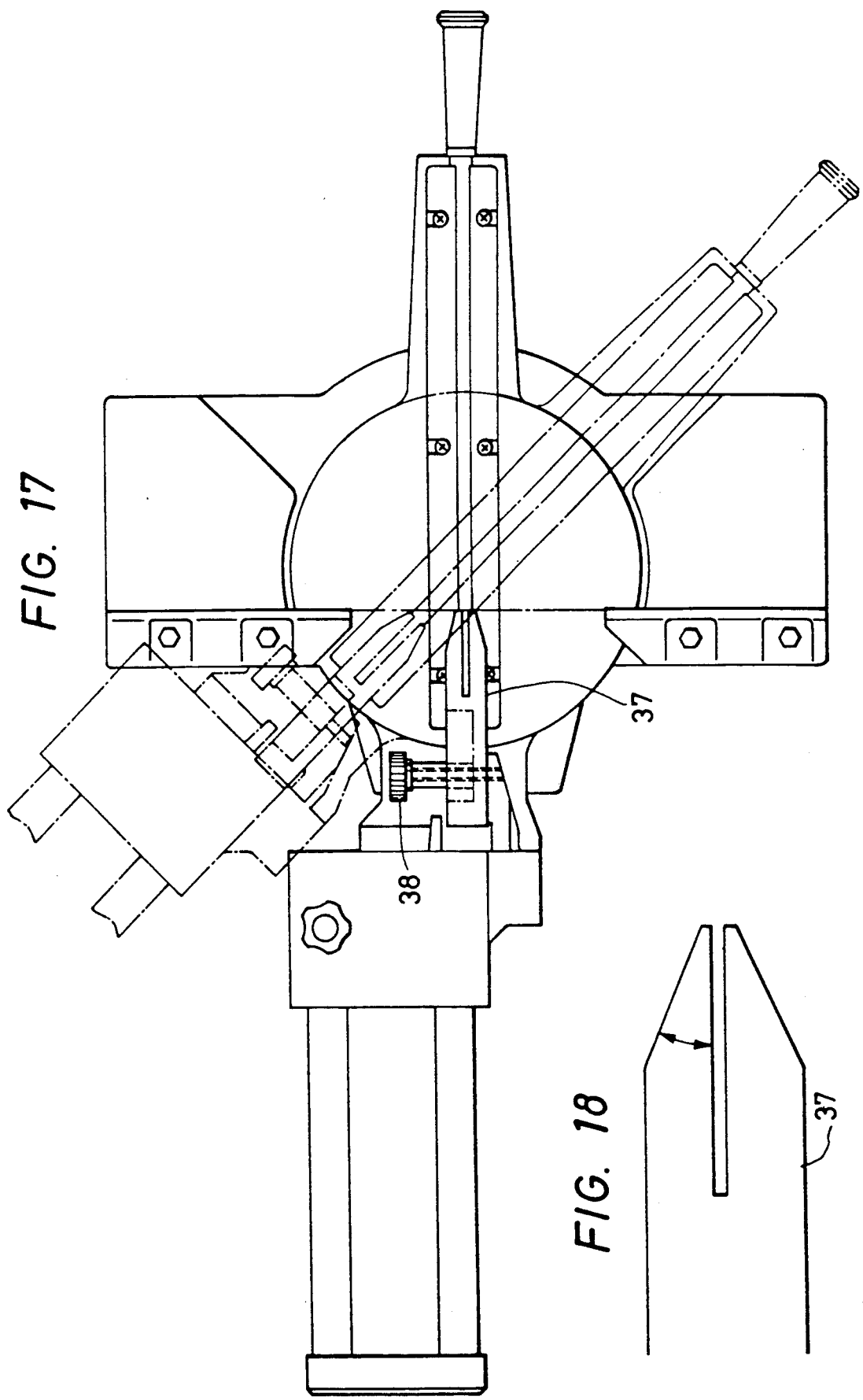

FIG. 22
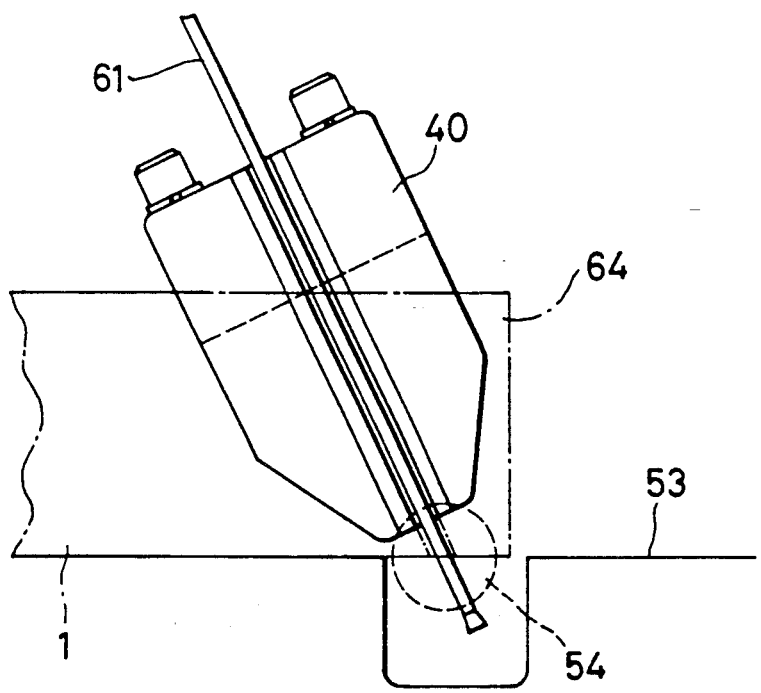
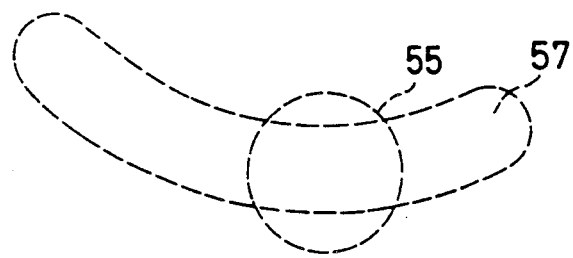

DESK-TOP CIRCULAR SAW

This is a continuation of application Ser. No. 07/127,023, filed Nov. 27, 1987, now U.S. Pat. No. 4,869,142.

BACKGROUND OF THE INVENTION

The present invention relates to a desk-top circular saw apparatus which is capable of cutting a wide material by a sliding action of a circular saw blade and performing angular and inclined cutting in an accurate and safe manner.

A conventional circular saw apparatus will now be described with reference to FIGS. 1, 2 and 3. In FIG. 1, a base 1 has a hinge 9 connected thereto, which hinge rotatably supports a gear casing 13 at one end. The casing has a motor 16 driving a circular saw blade 17 to cut a workpiece 2 supported on a fence 3 fixed to the base 1. The distance between the center of the saw blade 17 and the pivot of the hinge 9 is constant so that the maximum cutting width is obtained when the gear casing 13, and hence the saw blade 17, are lowered relative to the upper surface of the base 1 (L in FIG. 1). If the width of a workpiece is greater than L, an uncut portion will remain.

As shown in FIG. 2, if the saw has a movable gear casing 13 with which the saw can be extended to cut a wide workpiece 2, the distance between the center of saw 17 and the hinge 9 pivot will be lengthened so that a high load will be applied to a spring 15 at the pivot, making it difficult for the spring 15 to hold the saw. If the spring 15 is strengthened so as to hold the saw when the gear casing is extended, when cutting is carried out with the gear casing 13 retracted, the load of the spring 15 will be too strong, making the saw difficult to handle.

As shown in FIG. 8, a method is known for cutting two workpieces 2 obliquely to join them at their cut surfaces. Such a cutting operation is performed by placing a workpiece 2 on the cutting stand, rotating the turntable 4 to set it at a predetermined angle, pushing down the saw 17, and cutting the workpiece. However, if the workpiece has a large dimension H, the workpiece 2 will abut at its upper surface against the motor housing or the like so that an uncut portion will disadvantageously remain.

SUMMARY OF THE INVENTION

The invention is intended to eliminate the drawbacks discussed above with respect to the conventional saw.

The invention provides a desk-top circular-saw apparatus which is capable of increasing the cut width, performing angular cutting which involves cutting a workpiece by rotating a turntable, and inclined cutting involving inclining the saw relative to the base surface, to thus accomplish a variety of different sawing operations without impairing the operability of the saw.

With the invention, a wide workpiece can be cut by sliding the saw, and if an oscillating portion comprising a hinge pivoting the arm is moved, changes in the load of the spring are constant irrespective of the distance of movement of the oscillating portion.

BRIEF DESCRIPTION OF THE DRAWINGS

FIG. 9 is a side view of a second embodiment of a desk-top saw apparatus according to the invention;

FIG. 13 is a partial cross-sectional view of the safety cover of FIG. 12;

FIG. 14 is a side view of the saw with another type of a safety cover provided thereon;

FIG. 15 is a partial cross-sectional view of the cover of FIG. 14;

FIG. 17 is a top plan view of a desk-top circular saw apparatus having a guard function;

FIG. 18 is an enlarged view of a guard end;

FIGS. 20-22 illustrate other embodiments of a desk-top circular saw apparatus having a cut piece scattering preventing capability;

DESCRIPTION OF THE PREFERRED EMBODIMENTS

Figure 1:
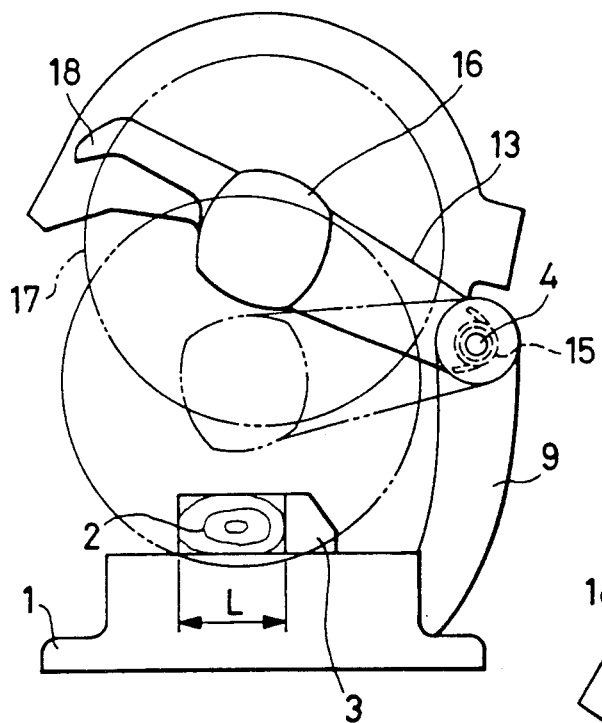
FIGS. 1, 2 and 3 are side views of a conventional desk-top circular saw apparatus.
Figure 2:
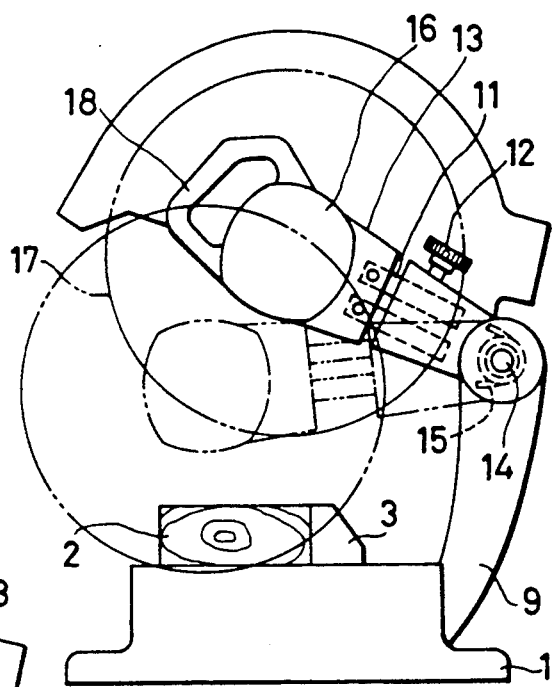
Figure 3:
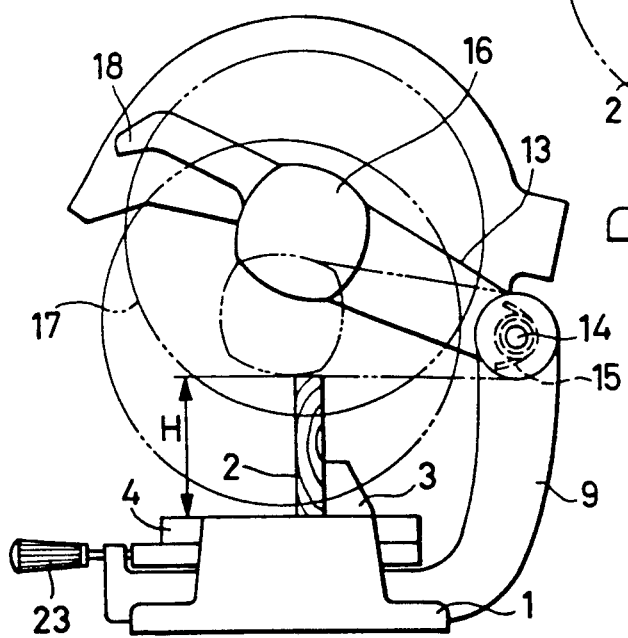
Figure 4:
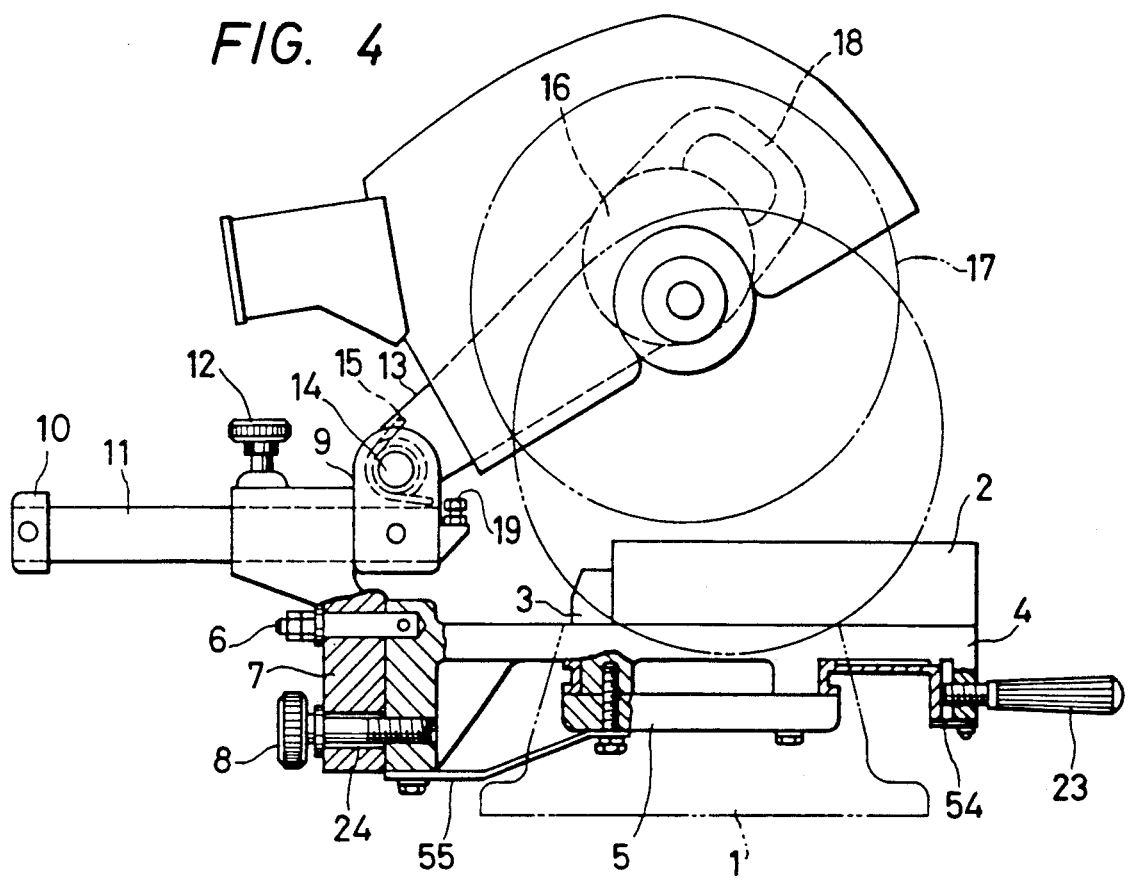
FIG. 4 is a side view of a first embodiment of a desk-top circular saw apparatus constructed according to the invention.

A first preferred embodiment of the invention will be described with reference to FIGS. 4 through 8.

A fence 3 which supports a workpiece 2 is fixed to the upper surface of a base 1. (Usually, a movable clamp jaw is provided which pushes the workpiece 2 against the fence 3, but this is not shown). A turntable 4 is rotatably fitted to the base 1, and the base 1 is held between the turntable 4 and a turntable holder 5 so that the turntable may rotate. A shaft 6 is fixed to one end of the turntable 4 so that the axis of the shaft 6 is flush with the upper surface of the turntable 4. The shaft 6 supports a holder 7 rotatably. A knob 8 is engaged threadedly to the turntable 4 to lock the holder 7 against rotation. The hole in the holder 7 in which the knob 8 is engaged is an arcuate slot 24 with the shaft 6 at the center thereof.

A hinge 9 and a support 10 fix a pair of guide bars 11 thereto disposed parallel to the turntable 4 to thereby form a frame. The guide bars 11 are fitted into holes in the holder 7 so as to slide substantially parallel to the upper surface of the turntable 4. A knob 12 fixes the sliding of the frame. A gear casing 13 is supported rotatably and oscillatably in the hinge 9 by a hinge shaft 14 and is pushed upwardly by a spring 15. A stop which sets the upper limit position of the gear casing 13 should also be provided, but is not shown.

A motor 16 is provided on the gear casing 13 to drive a circular saw blade 17 via a power transmission. A handle 18 is used to push the gear casing 13 downward. The gear casing 13 can abut against a bolt 19 which serves as a lower limit stop. Fixed to the turntable 4 are blade guide plates 20 and 21, with the plate 21 having elongated holes allowing the plates to move in accordance with the position of the saw 17. Screws 22 fixing the plates 20 and 21 are arranged so as to not protrude beyond the upper surfaces of the plates 20 and 21 by providing recesses in the plates 20 and 21.

A grip 23 is threadedly engaged with the side of the turntable 4 so that rotating the grip 23 causes it to be press against the side of the base 1 to thereby restrict the rotation of the turntable 4. A plate 54 is fixed to the lower surface of the turntable 4 to hold the base 1 together with a "C" portion of the turntable 4 so as to allow the turntable 4 to rotate. A support plate 55 is fixed to the lower surfaces of the turntable holder 5 and turntable 4 to reinforce the turntable 4.

In the above arrangement, when a small workpiece is to be cut perpendicular to the fence 3, it is required to restrict the sliding movement of the hinge 9 with the knob 12, to fix the workpiece 2 by pressing it against the fence 3, to push down the saw until the gear casing 13 abuts the bolt 19, and then to cut the workpiece perpendicularly thereto. At this time, the knob 8 is tightened and the holder 7 is fixed against rotation. This operation is quite the same as in a conventional desk-top circular saw.

When a workpiece is to be cut at non-perpendicular angle to the surface of the fence 3, the grip 23 is loosened, the turntable 4 is rotated, and the angle between the fence 3 and the saw blade 17 is adjusted to a predetermined value and fixed. Cutting is performed as in the previous perpendicular cutting operation. Thin angular cutting is done in the same manner as in the conventional desk-top saw apparatus.

Figure 5:
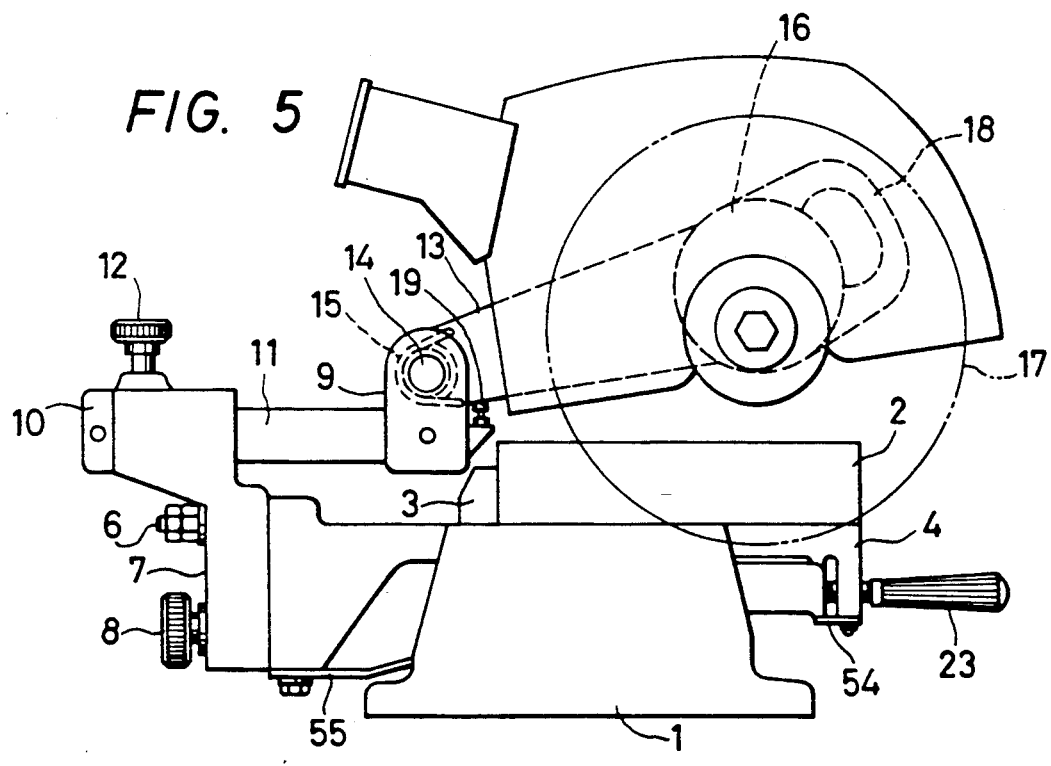
FIG. 5 is a side view of the saw of FIG. 4 in a slid state.
Figure 6:
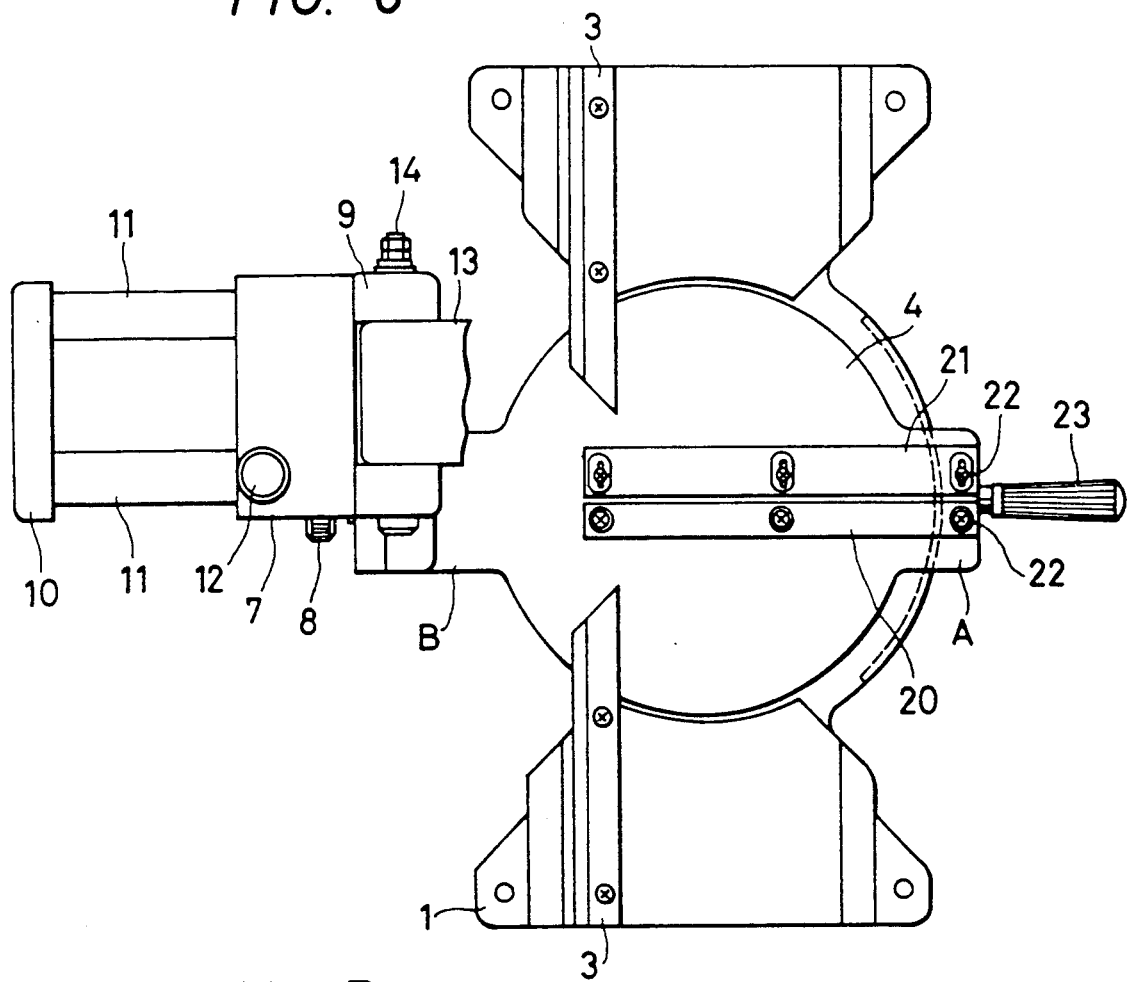
FIG. 6 is a top plan view of the apparatus of FIG. 4.

When a wide material is to be processed by perpendicular cutting or angular cutting, the workpiece 2 is forced against the fence 3 and fixed thereto, the knob 12 is loosened, the motor 16 is moved forwardly, and the handle 18 is pushed downward, as shown in FIG. 5, to form a cut in the workpiece. The gear casing 13 is then caused to abut the bolt 19 while the saw is being slid rearwardly, whereupon the workpiece is cut. After cutting, when the downward pushing force is reduced, the spring 15 pushes the saw upwardly.

Figure 7:
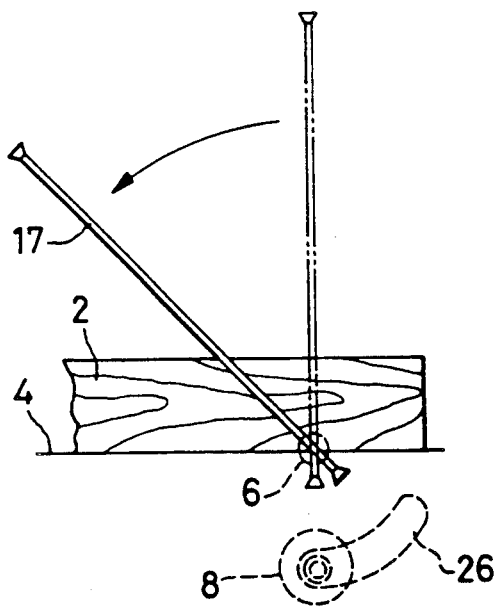
FIG. 7 illustrates an inclined saw of the apparatus according to this invention.
Figure 8:
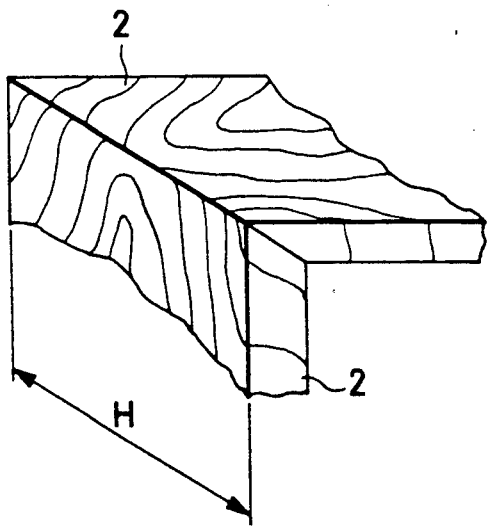
FIG. 8 illustrates a joint.
Figure 10A:
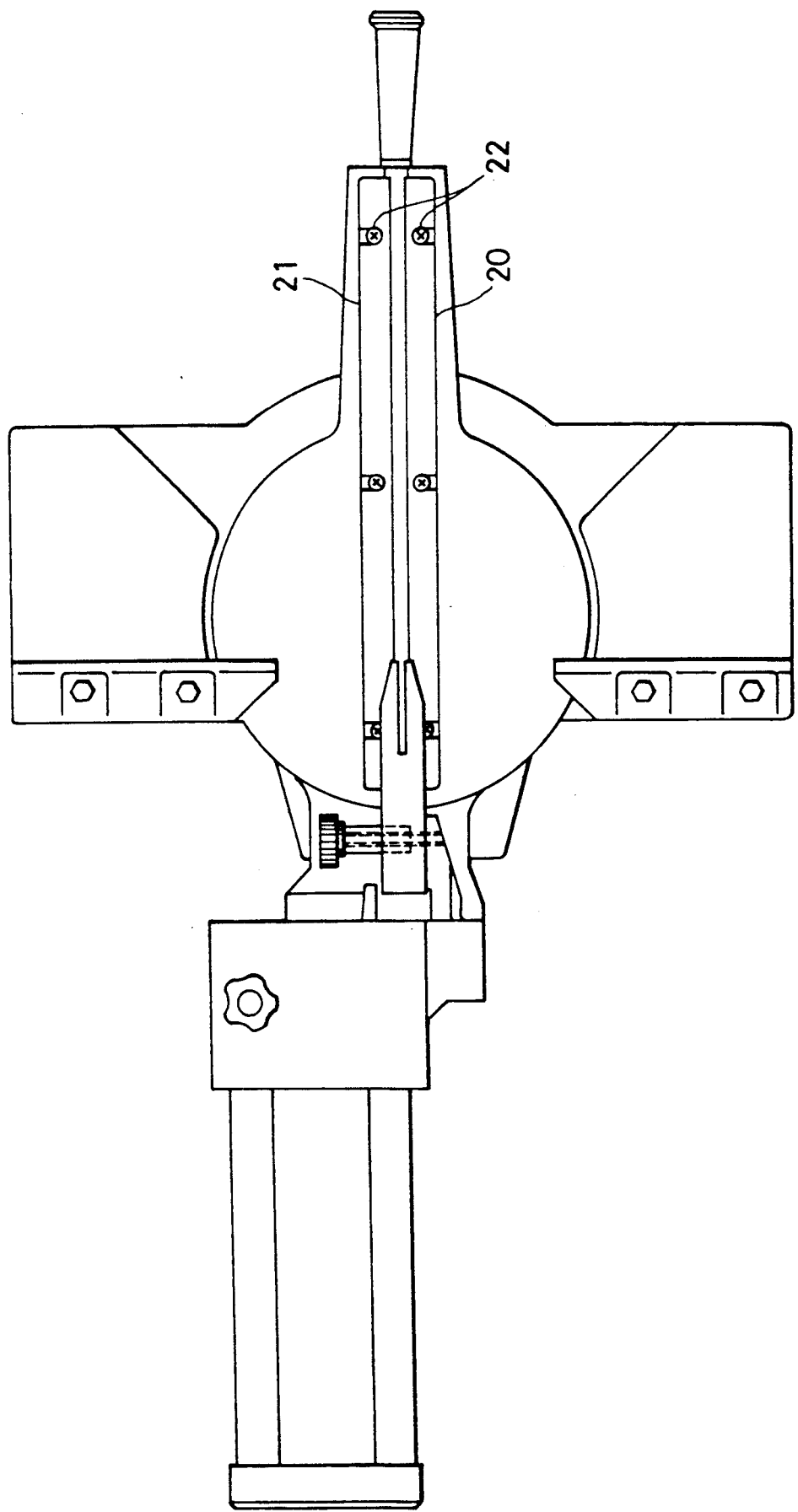
FIG. 10A is a top plan view of the embodiment of FIG. 9.
Figure 10B:
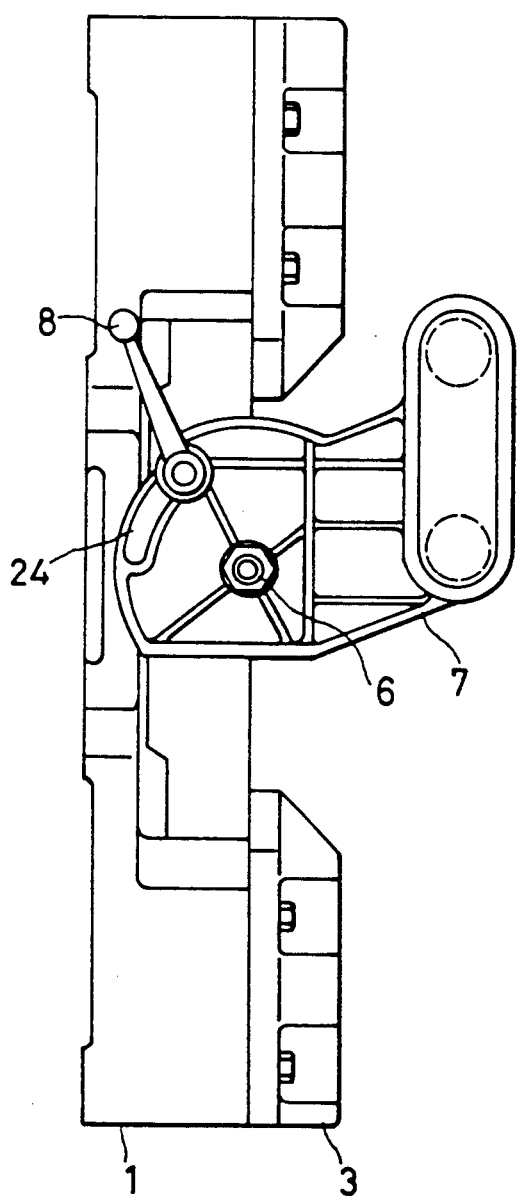
FIG. 10B is a bottom rear view of the apparatus of FIG. 9.
Figure 11:
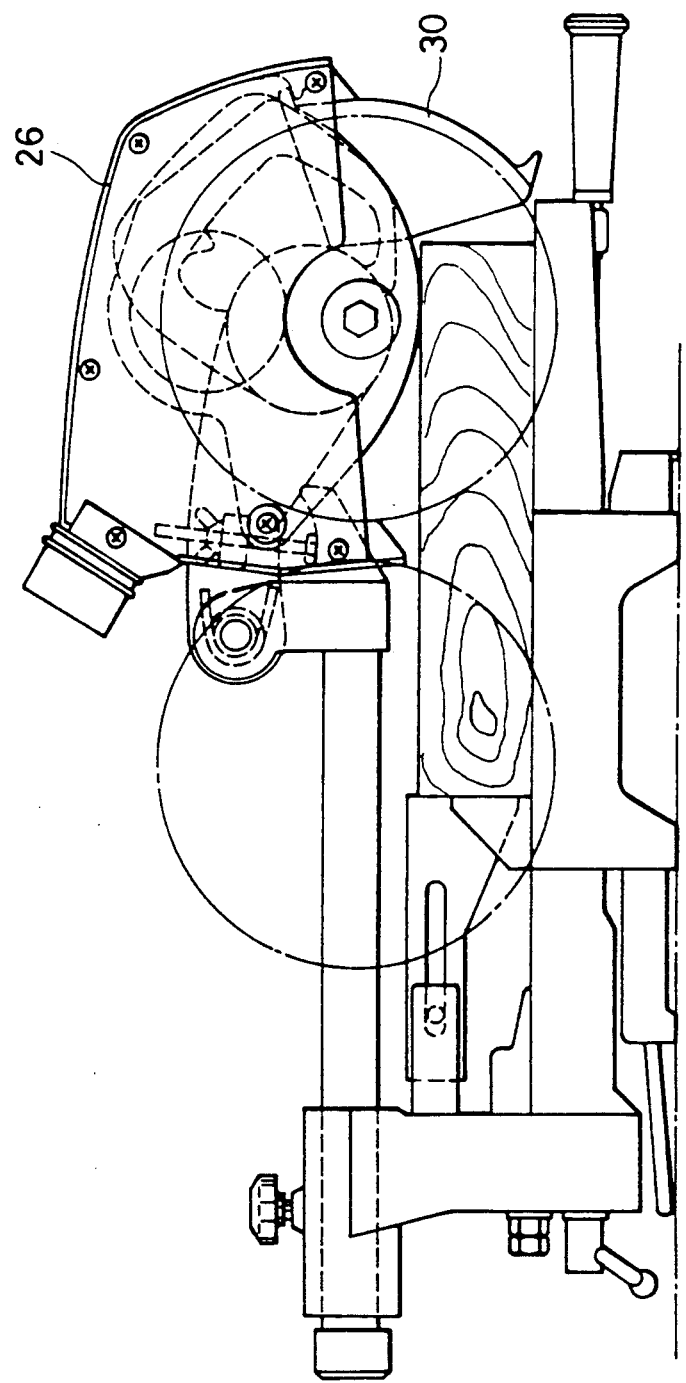
FIG. 11 is a side view of the saw of the second embodiment slid forwardly for performing a cutting operation.
Figure 12:
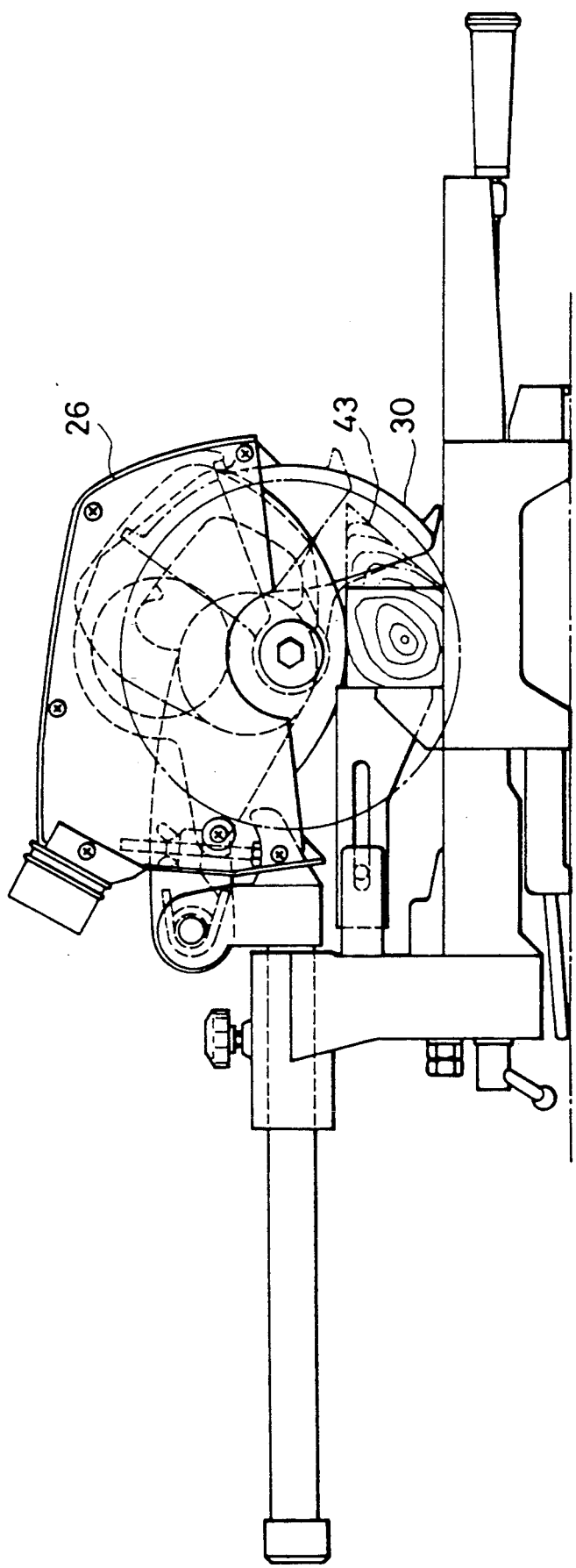
FIG. 12 is a side view of the second embodiment of the saw apparatus with a safety cover provided thereon.

When a joint shown in FIG. 8 is to be formed, the knob 8 is loosened, the holder 7 is rotated, the oblique angle between the turntable 4 upper surface and the saw 17 is adjusted to a predetermined value, and the knob is tightened to fix the holder 7 (FIG. 7). Alternatively, a clamp lever 8 shown in FIG. 25, may be used instead of the knob. At this time, the blade guide plate 21 is protected by loosening the screws 22 to a position where it cannot abut the saw blade 17 when the saw 17 is inclined. After the inclined angle is set, the guide plate 21 is caused to abut the saw blade 17 and fixed with the screws 22. The workpiece can then be cut in a process of perpendicular cutting or angular cutting, as described above.

A desk-top circular saw apparatus is thus provided which is capable of perpendicular, angular or inclined cutting, finding uses many applications.

When a wide workpiece 2 is to be cut by increasing the sliding distance of the hinge 9, the protrusions (A and B in FIG. 6) of the turntable 4 are extended in order to strengthen the protrusions; the plate 54 and the support plate 55 are effective means for supporting the protrusions.

According to this invention, the circular saw is made slidable so that a wide workpiece can be cut. The hinge is also made slidable so that the load exerted on the spring is constant irrespective of the sliding distance of the saw. Accordingly, a desk-top saw apparatus having good operability is provided. Perpendicular, angular or inclined cutting is possible, so that usage in many applications is possible.

A second embodiment of this invention will be described with reference to FIGS. 9-13. Like reference numerals are used to denote like parts in the first and second embodiments, and a further description of the common parts will be omitted.

The upper half of the circular saw blade 17 is covered with a saw cover 26 fixed to the motor 16, while both sides of the lower half of the saw blade 17 are covered with safely covers 28, 29 rotatably mounted within the saw cover 26 around a cover support 27 of the rear end of the saw cover 26. The motor 16 has at one end a handle 18 for controlling the cutting operation.

Safety covers 28 and 29 are supported rotatably around the cover support 27 at the rear end of the saw cover 26 so as to cover the lower half of the saw blade 17 and both rear sides of the saw blade 17. A subcover 30 covering the forward portion of the saw blade 17 is pivoted to a subcover holder 30b rotatably mounted around the same shaft as the saw blade shaft 25 of the motor 16.

In this arrangement, when a workpiece is to be cut by the saw blade 17, the lower half of the saw blade 17 is not exposed as in the conventional saw previous to cutting. When cutting starts, the safety covers 28, 29 rise, abutting the workpiece 2. However, since the subcover 30 provided separately from the safety covers 28, 29 does not abut the workpiece 2, the forward portion of the saw blade 17 is not exposed at all. When a maximum-width workpiece 43 is to be cut, the subcover 30 and the workpiece 43 will abut each other so that the subcover 30 rises and a part of the blade 17 is exposed, but only to a small extent.

A modification of the safety covers for the saw blade of the second embodiment will now be described with reference to FIGS. 14-16. Reference numerals 31, 32 denote a pair of lower cover members covering both sides of the lower half of the saw blade 17. The lower cover members 31, 32 are pivoted around a cover support 27 provided within the rear end of the upper cover 26, restricted by an engaging member (not shown) provided inside the upper cover 26 so as to cover the lower half of the saw blade 17, as shown in FIG. 14. A cover holder 34 in the form of a "U" in cross section as shown in FIG. 15 is interposed between the opposing ends of the lower cover members 31 and 32, while the lower cover member 32 is fixed via a screw 36 to one side 34a of the cover holder 34. On the other hand, two elongated holes 33a, 33b are provided in the end of the lower cover 31 to receive screws 35, 35' provided in the other side 34b of the cover holder 34. The lower cover member 31 is held by the cover holder 34 so that it can rotate separately from the lower cover 32.

Figure 16:
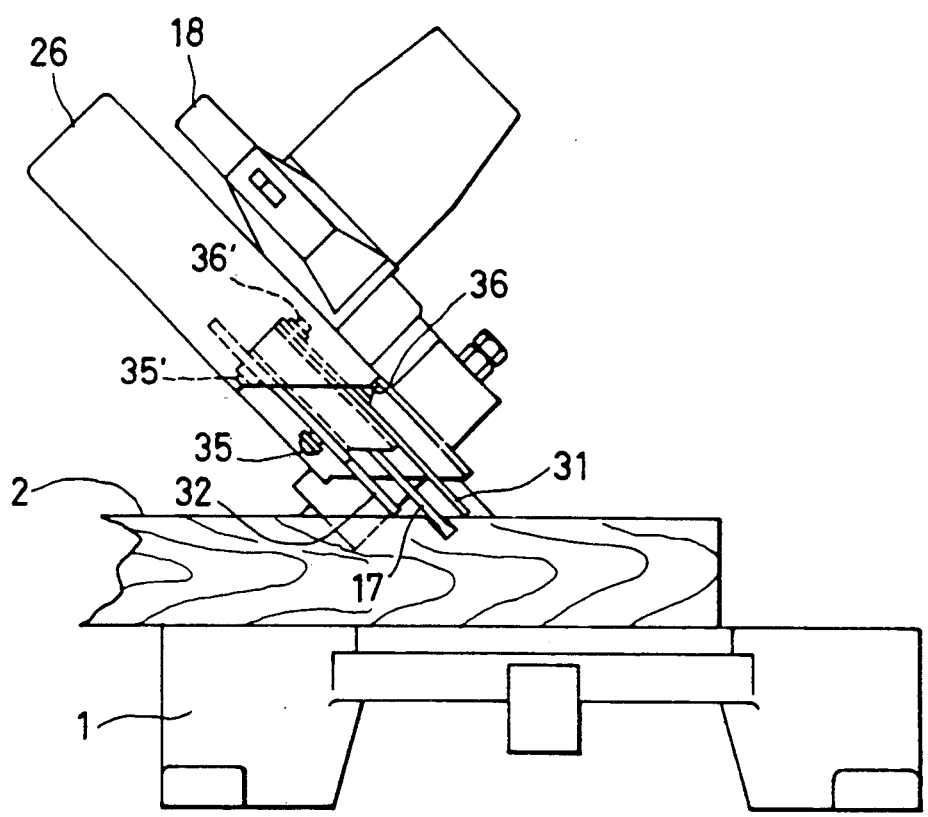
FIG. 16 illustrates the inclination of the saw apparatus of the embodiment of FIG. 14.
Figure 19:
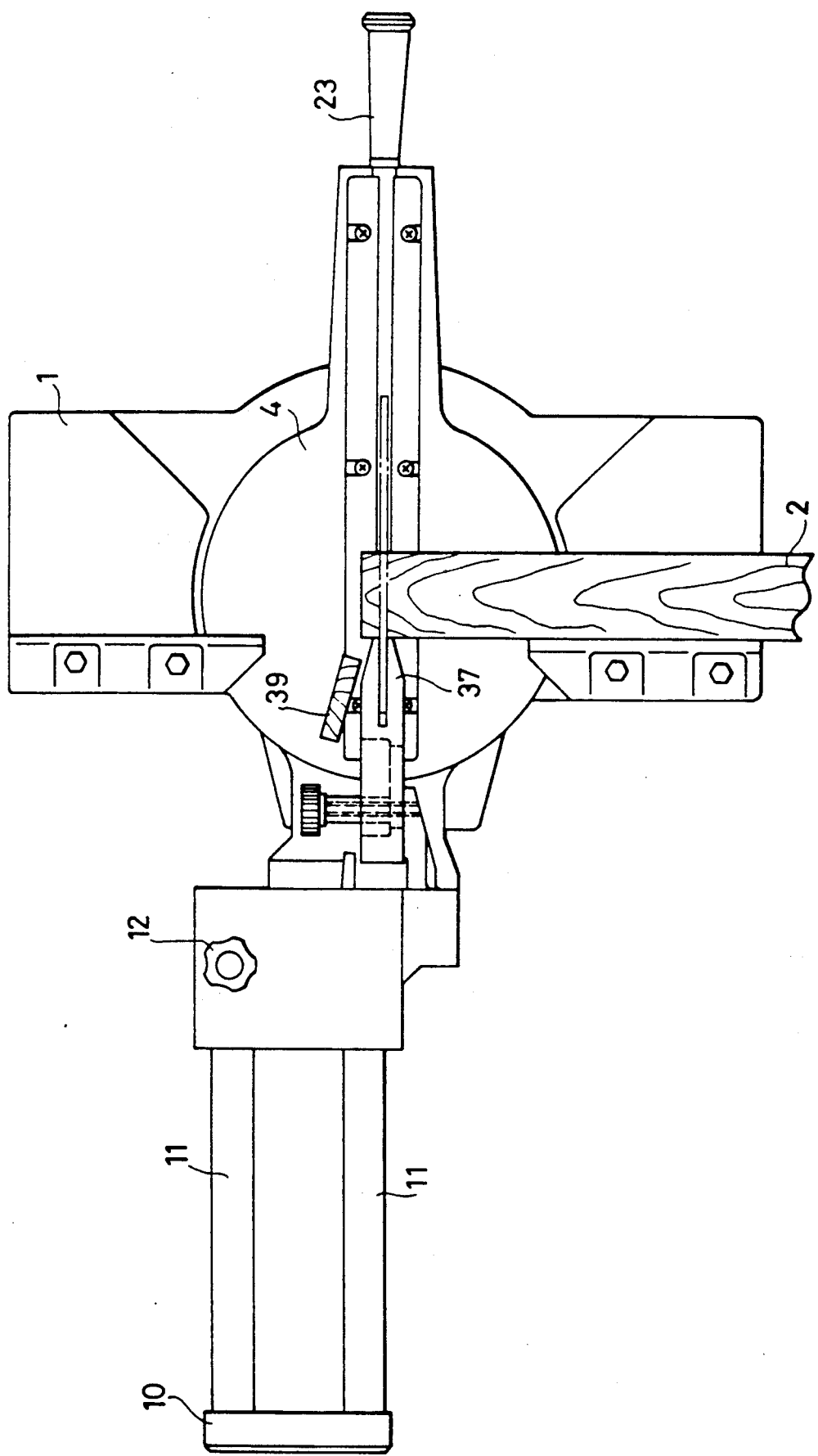
FIG. 19 is a top plan view showing a cut piece scattering preventing operation of a desk-top circular saw apparatus having a guard.

According to this embodiment, when inclined cutting is performed as shown in FIG. 16, namely, when a workpiece 2 is to be cut with the saw blade 27 inclined via the hinge mechanism 9 in one direction, the lower cover members 31, 32 and saw blade 17 act as follows: First, when operating handle 18 is lowered, the lower cover members 31, 32 are lowered, covering the saw blade 17. Then, the lower cover member 32 lower than the inclined saw blade 17 abuts the workpiece 2 and is thereby urged upwardly. The cover member 32 is moved in a rotating manner relative to the saw blade 17 and to the lower cover member 31 higher than the inclined blade 17 while abutting the workpiece 2 via the elongated holes 33a, 33b provided at the end portion of the lower cover 32, as shown in FIG. 16. On the other hand, since the lower cover member 31 does not move together with the lower cover member 32, it maintains its present state while abutting the workpiece 2.

When the saw blade 17 is further lowered (to perform cutting), the lower cover member 31 outside the inclined saw blade 17 abuts the workpiece 2 while rotating upwardly relative to the saw blade 17.

Therefore, according to this embodiment, during inclined cutting, both the lower cover member 32 and the lower cover member 31 abut the workpiece 2, so that the spacing between the cover members 31, 32 and the workpiece 2 can be reduced, and thus the saw blade portion exposed during the cutting operation is reduced to a minimum to thereby perform safer cutting.

The structure and advantages of a guard 37 provided in the desk-top circular saw according to this invention will be described with reference to FIGS. 9 and 17-19. The guard 37 is fixed in a slot 44 provided in the forward protrusion of the holder 7 by a thumbscrew or knob 38. First, the knob 38 locks the guard 37 so that the workpiece support surface of the fence 3 and the edge of the guard 37 assume the same position, and the handle 18 is then pushed down to form a cut in an end of the guard 37. Then, an ink line (cutting line) drawn on the upper surface of the workpiece 2 and the cut formed in the guard 37 end are aligned, thereby completing the ink line alignment. Thus, it is only required to push down the handle 18 to cut the workpiece 2. When the holder 7 is also inclined to perform inclined cutting of the workpiece, the guard 37 is inclined together with the holder 7. A similar technique to that already described may then used to cut the workpiece. When the turntable 4 is rotated to perform angular cutting of the workpiece, the guard 37 is retracted and fixed by the knob 38 in order to prevent the guard 37 from protruding from the workpiece support surface of the fence 3.

In the above description, the center of rotation of the turntable 4 is selected to be at a position forwardly of the workpiece support surface of the fence 3 so that the guard 37 can be retracted for angular cutting. When the center of rotation of the turntable 4 is selected to be at a position rearwardly of the workpiece support surface of the fence 3, the guard 37 is advanced for angular cutting. As shown in FIG. 18, if the forward end of the guard 37 has an inclined surface, the appropriate angle of the inclined surface is less than 30°, preferably in the range of 15°-20°.

According to the invention, a guard which can be cut by the saw blade is and movable back and forth is provided on the inclinable holder at the rear portion of the turntable so that relative adjustment between the guard end and the workpiece support surface of the fence can be freely performed in all positions used for perpendicular, angular and inclined cutting. The operator can easily form a cut in the guard suitable for the particular saw blade. Both sides of the saw blade are covered so as to be held in the cut. Therefore, the workpiece is completely prevented from being dragged by the saw blade, providing a cut surface without burrs, which would otherwise be produced during the cutting operation.

A further excellent effect is that alignment of the cut and the ink line drawn on the workpiece provides simple and correct alignment of the workpiece.

Moreover, the guard prevents the scattering of cut pieces and sawdust. This function will be described with respect to another embodiment shown in FIGS. 20-22.

A workpiece 51 is supported by a fence 52 attached to a base 53, to an end of which a holder 56 is mounted so as to be rotatable around a holder shaft 54. The axis of the holder shaft 54 is flush with the upper surface of the base 53. A knob 55 restricts the rotation of the holder 56, which has a hole in which the knob 55 is mounted and takes the form of an elongated hole 57. The holder 56 rotatably holds a gear casing 59 around a pin 58, and is pushed upwardly by a spring 66. The movement of the gear casing 59 is limited by upper and lower limit stops. The gear casing 59 is provided with a motor 60, a rotatable circular saw blade 61, and a handle 62 to move the saw blade 61 downwardly. A guard 40 is attached to the holder 56. The guard 40 is held so that its end does not protrude beyond the workpiece support surface of the fence 52 toward the operator, and it has an inclined passage way on its side which guides cut wood pieces 64.

Figure 20:
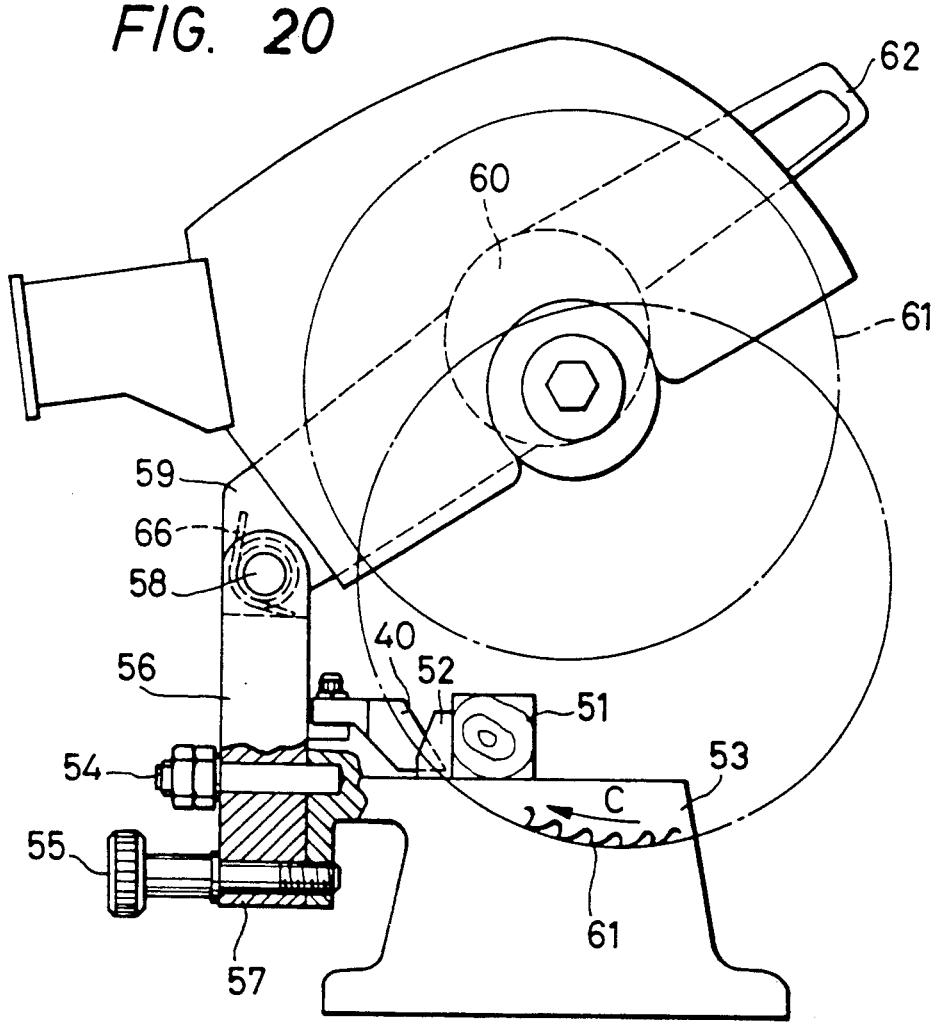
Figure 21:
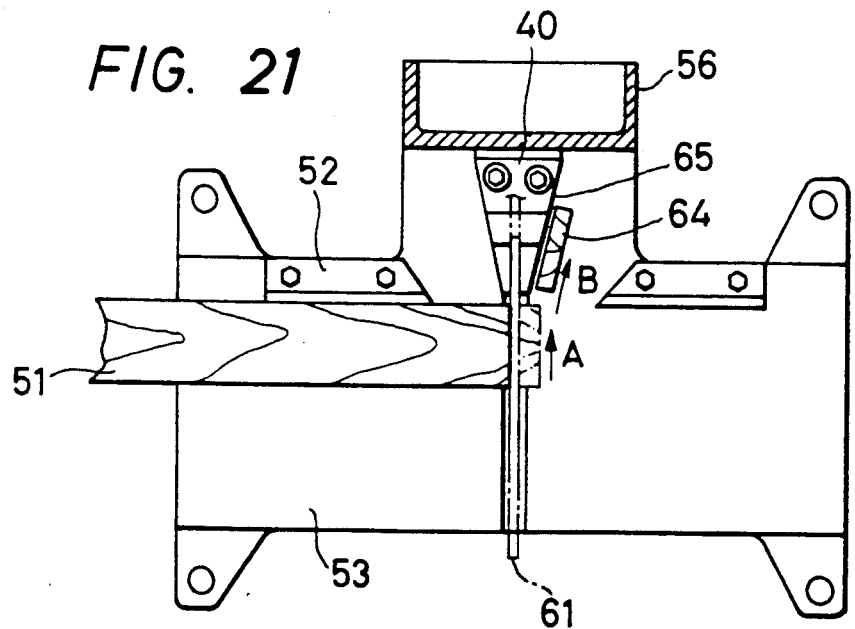

In the above structure, when end cutting is performed as shown in FIG. 21, the cut wood piece 64 is moved in the direction A in FIG. 21, because the saw blade 61 rotates in the arrow of C in FIG. 20, and then in the direction of B along an inclined surface 65. Therefore, the saw blade 61 is released from contact with the wood piece 64, whereby the wood piece 64 is prevented from being scattered. As shown in FIG. 22, when end cutting is performed by inclining the saw 61 relative to the base 53 surface, the wood piece 64 follows the saw 61 and is very likely to be scattered where the guard 40 not present.

As described above, the wood piece guide is provided on the holder so that the cut wood pieces are prevented from contacting the saw blade, and hence the wood pieces are prevented from being scattered due to drag on the saw blade, thus providing a safe cutting operation.

Figure 23:
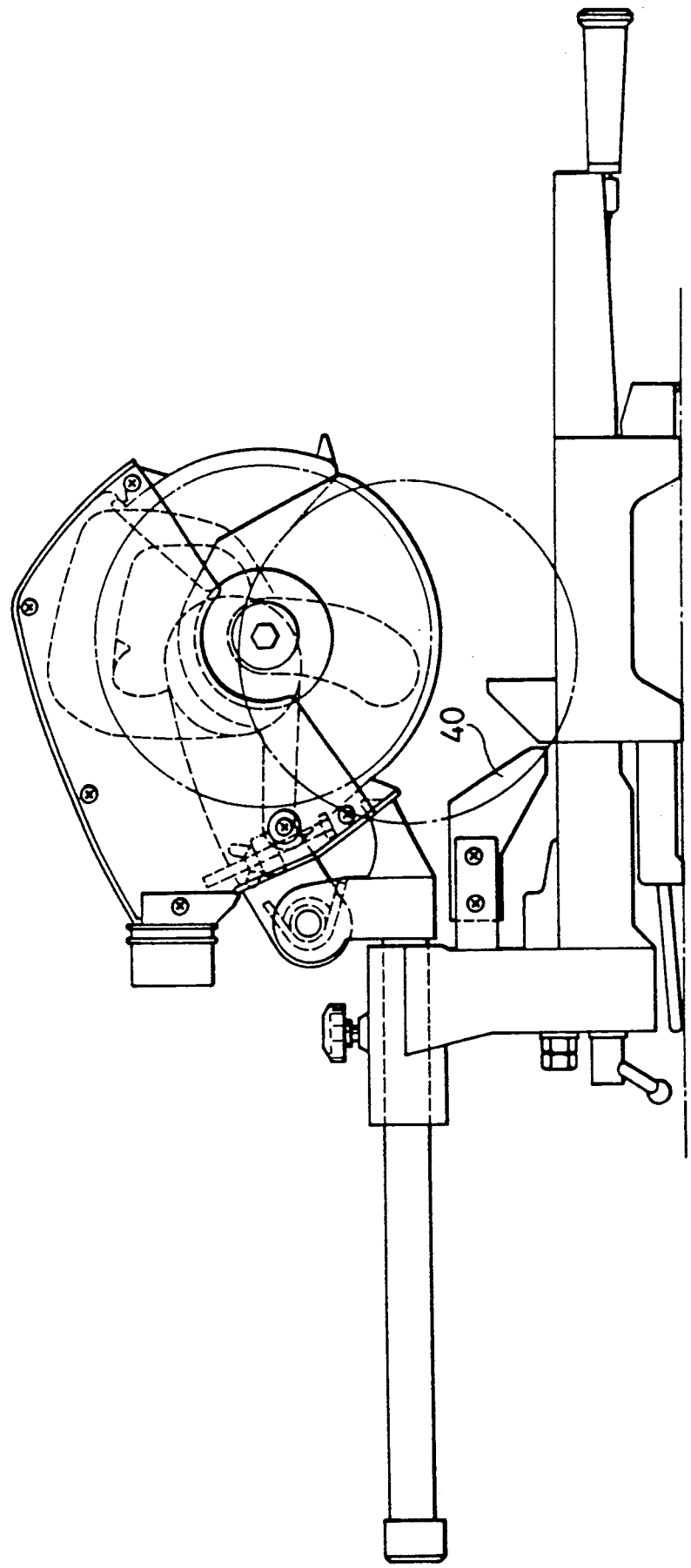
FIG. 23 shows a still further embodiment.

FIG. 23 shows a guard which prevents scattering of wood pieces and which does not required the ink-line alignment needed in the second embodiment of FIG. 9.

Figure 24:
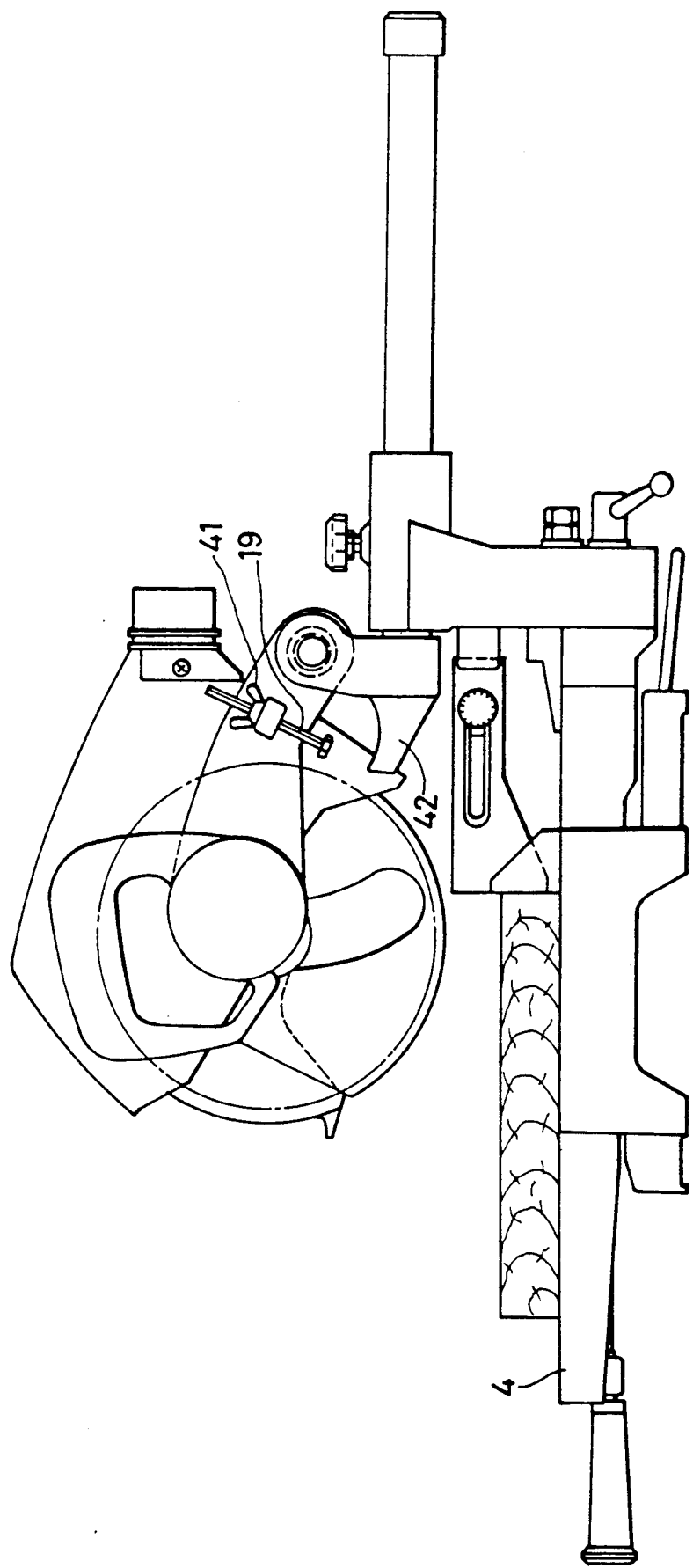
FIGS. 24 and 25 are side views of a saw apparatus having a lower limit stop.

A lower limit position stop of a desk-top saw according to this invention will now be described with reference to FIGS. 24 and 25. A turntable 4 is supported rotatably on a base 1. A fence 33 is provided on the base 1 to support a workpiece 2. A holder 7 is supported inclinably at the rear end of the turntable 4 relative to the turntable 4. A slide shaft 11 is provided which is slidable back and forth on an upper end of the holder 7 so as to be parallel to the upper surface of the base 1. A motor 16 having a saw blade 17 and a drive for the blade 17 is rotatably supported vertically on top of a hinge 9 provided at the forward end of the slide shaft 11. The motor 16 has a screw 19 (lower limit stop bolt) engaged threadedly therewith and can be fixed by a butterfly nut 41. The hinge 9 has a stop 42 which has an upper arcuate surface 42a which can abut the screw 19.

In the above arrangement, when the lower limit position of the saw 17 is to be restricted, the butterfly nut 41 is loosened and the screw 19 is rotated to abut against the stop 42. The butterfly nut 41 is then tightened to fix the position of screw 19.

Figure 25:
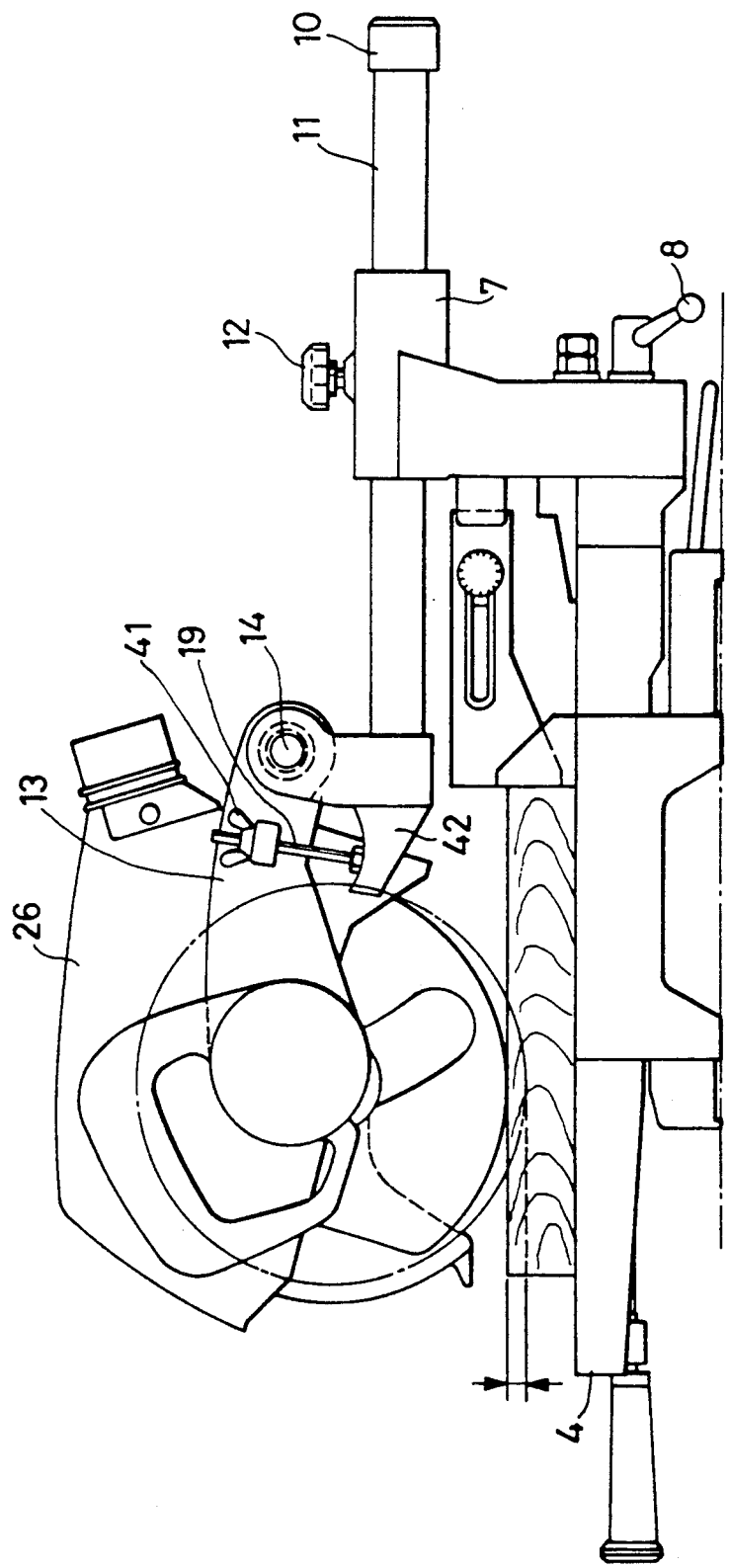
Figure 26:
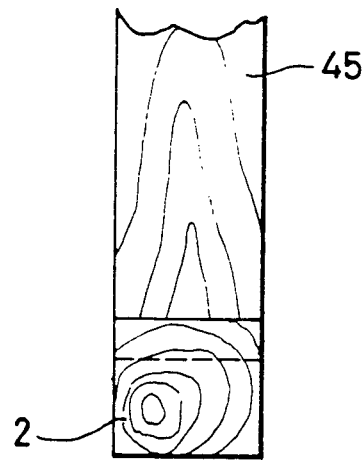
FIG. 26 and 27 illustrate the joining of a workpiece and a connection plate.
Figure 27:
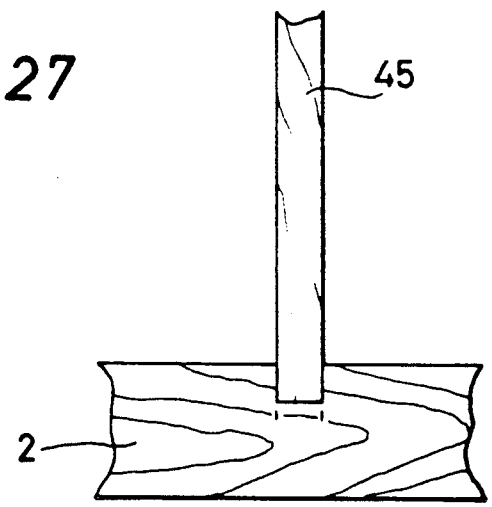

As shown in FIG. 25, cutting a workpiece 2 midway is performed, for example, when a rabbetted panel 45 is joined to the workpiece 2, as shown in FIGS. 26 and 27. When the handle 18 is lowered, the screw 19 contacts the arcuate stop 42 of the hinge 9 to thereby restrict further lowering of the saw 17, thus providing a constant cutting depth. Since fixing the screw 19 is performed by the motor 16, it is not hindered by the saw blade 17. Thus, the operability of the saw is very good and the operator is protected from contacting the saw blade 17 during the cutting operation.

According to the invention, the lower limit position stop includes an arcuate surface formed on the hinge, so that the stop effects face-to-face contact with the bolt in any restricted position. Therefore, the abutting portion of the stop is prevented from being deformed, thereby providing stabilized position restriction. Since the device for fixing the screw is disposed at the motor, the screw fixing is not hindered by the saw blade, cover, etc. The operating position is good, and the operator is protected from contacting the saw blade during its operation.

What is claimed is:

1. A desk-top slidable circular saw apparatus comprising:
 a base;
 a turntable, mounted on a substantially central portion of said base in a rotatable manner, for supporting a workpiece;
 a motor section disposed above said turntable;
 a circular saw disposed on said motor section, said saw having a drive shaft with a circular saw blade mounted thereon, wherein said motor section may be lowered toward the top of said turntable, so that a workpiece arranged on said turntable may be cut by said circular saw;
 a hinge arranged at a rear end of said motor section, said motor section and said hinge being connected about a first pivot that is in parallel with the drive shaft of said circular saw;
 a shaft member having an axis in parallel with the saw blade of said circular saw and being fixed to a lower portion of said hinge; and
 a holder for slidably supporting said shaft member so that said shaft member is slidable in the axial direction thereof and so that a distance between said hinge and said saw drive shaft is kept constant when said shaft member slides in the axial direction, said holder being connected to said turntable about a second pivot that has an axis in a plane flush with the top of said turntable under the condition that said shaft member and said turntable top are kept in parallel with each other, said first pivot serving as a pivot for the up-and-down movement of said circular saw being always moved in a horizontal direction.

2. The desk-top slidable circular saw apparatus as defined in claim 1, wherein said holder is rotatable about the second pivot in order to adjust an oblique angle between an upper surface of said turntable and said saw to a predetermined value.

* * * * *